US010464016B2

(12) United States Patent
Bergmair et al.

(10) Patent No.: US 10,464,016 B2
(45) Date of Patent: Nov. 5, 2019

(54) SYSTEM FOR MEMBRANE ASSISTED HUMIDITY HARVESTING FROM A FEED FLOW, WIND TURBINE PROVIDED THEREWITH AND METHOD THERE FOR

(71) Applicant: Rainmaker Worldwide Inc., Peterborough (CA)

(72) Inventors: Daniel Bergmair, Leeuwarden (NL); Hendrik Cornelis De Lange, Leeuwarden (NL); Sybrandus Jacob Metz, Leeuwarden (NL)

(73) Assignee: Rainmaker Worldwide Inc., Peterborough (CA)

( * ) Notice: Subject to any disclaimer, the term of this patent is extended or adjusted under 35 U.S.C. 154(b) by 169 days.

(21) Appl. No.: 15/547,012

(22) PCT Filed: Jan. 25, 2016

(86) PCT No.: PCT/NL2016/050055
§ 371 (c)(1),
(2) Date: Jul. 27, 2017

(87) PCT Pub. No.: WO2016/122315
PCT Pub. Date: Aug. 4, 2016

(65) Prior Publication Data
US 2018/0021719 A1    Jan. 25, 2018

(30) Foreign Application Priority Data

Jan. 28, 2015    (NL) .................................... 2014202
Feb. 6, 2015    (NL) .................................... 2014250

(51) Int. Cl.
*B01D 53/22*    (2006.01)
*B01D 53/26*    (2006.01)
(Continued)

(52) U.S. Cl.
CPC ......... *B01D 53/229* (2013.01); *B01D 53/228* (2013.01); *B01D 53/265* (2013.01);
(Continued)

(58) Field of Classification Search
CPC .... B01D 53/22; B01D 53/228; B01D 53/229; B01D 53/265; B01D 53/268;
(Continued)

(56) References Cited

U.S. PATENT DOCUMENTS 5,681,433 A * 10/1997 Friesen ................ B01D 53/229
159/DIG. 27
5,843,209 A * 12/1998 Ray ...................... B01D 53/229
95/52
(Continued)

FOREIGN PATENT DOCUMENTS

EP    0532368    3/1993
EP    0778068    6/1997
(Continued)

*Primary Examiner* — Jason M Greene
(74) *Attorney, Agent, or Firm* — Marcus C. Dawes

(57) ABSTRACT

The invention relates to a system for membrane assisted humidity harvesting, a turbine provided therewith and method therefor. The system according to the invention comprises:—a membrane unit with: a membrane, a feed flow inlet and a feed flow outlet on a first side of the membrane, and a recirculation inlet and a recirculation outlet on a second side of the membrane; wherein the membrane is configured to allow vapor to permeate through the membrane from the first side to the second side of the membrane; a condensing system provided on the second side of the membrane, configured for condensing vapor; and a recirculation pump configured for producing a recirculation flow on the second side of the membrane.

16 Claims, 6 Drawing Sheets

(51) Int. Cl.
    *E03B 3/28*         (2006.01)
    *B01D 71/52*      (2006.01)
    *B01D 71/56*      (2006.01)
    *B01D 71/80*      (2006.01)
    *F25B 13/00*      (2006.01)

(52) U.S. Cl.
    CPC ........... *B01D 53/268* (2013.01); *B01D 71/52* (2013.01); *B01D 71/56* (2013.01); *B01D 71/80* (2013.01); *E03B 3/28* (2013.01); *F25B 13/00* (2013.01); *B01D 2053/221* (2013.01)

(58) Field of Classification Search
    CPC .. B01D 2053/221; B01D 71/52; B01D 71/56; B01D 71/80; B01D 2257/80; B01D 2311/13; E03B 3/28; Y02A 20/109
    See application file for complete search history.

(56) References Cited

U.S. PATENT DOCUMENTS

| | | | | |
|---|---|---|---|---|
| 6,156,096 | A * | 12/2000 | Sirkar | B01D 53/228 95/44 |
| 2011/0247353 | A1* | 10/2011 | Metz | B01D 53/268 62/291 |
| 2012/0024749 | A1* | 2/2012 | Strack | C10G 9/002 208/44 |
| 2014/0319706 | A1* | 10/2014 | Huizing | B01D 53/228 261/102 |

FOREIGN PATENT DOCUMENTS

| | | |
|---|---|---|
| EP | 0824034 | 2/1998 |
| EP | 2181743 | 5/2010 |

* cited by examiner

SYSTEM FOR MEMBRANE ASSISTED HUMIDITY HARVESTING FROM A FEED FLOW, WIND TURBINE PROVIDED THEREWITH AND METHOD THERE FOR

The present invention relates to a system for membrane assisted humidity harvesting from a feed flow, such as ambient air.

From practice a number of water production techniques is known to provide access to safe drinking water. For example, desalination techniques can be used in areas that are close to the sea.

EP 2181743 A1 A discloses a device that produces liquid water from ambient air using a heat pump, cooling unit and receiver for collecting water formed as condensed water on a cooling surface, wherein a water vapour permeable membrane separates ambient air and the cooling surface. This device reduces the required amount of energy for harvesting drinking water by cooling down humid ambient air and preventing energy waste due to the undesired production of cold air, rather than production of water. However, there is still a significant amount of energy required for the production of drinking water.

Therefore, one of the objectives of the present invention is to reduce the amount of energy required for humidity harvesting and/or provide a more cost effective system for such harvesting.

This objective is achieved with the system for membrane assisted humidity harvesting from a feed flow according to the invention, the system comprising:
- a membrane unit with:
  - a membrane,
  - a feed flow inlet and a feed flow outlet on a first side of the membrane, and
  - a recirculation inlet and a recirculation outlet on a second side of the membrane;
  wherein the membrane is configured to allow vapor to permeate through the membrane from the first side to the second side of the membrane;
- a condensing system provided on the second side of the membrane, configured for condensing vapor; and
- a recirculation pump configured for producing a recirculation flow on the second side of the membrane.

The system comprises a membrane unit with a membrane having a first side and a second side. A feed flow inlet and a feed flow outlet are provided on the first side of the membrane. The membrane enables transfer of components from the feed flow on the first side of the membrane to the second side of the membrane. For example, in a presently preferred embodiment the membrane is configured to allow vapor to permeate through the membrane from the fist side to the second side of the membrane. On the first side of the membrane, the feed flow preferably comprises humid air. By providing the membrane unit with a water vapor selective membrane, water vapor can be separated from other components in the outside air or ambient air, enabling water vapor concentration on the second side of the membrane. The driving force for the permeation through the membrane is the difference in partial pressure on the first side and the second side of the membrane.

By providing a condensing system on the second side of the membrane, with the condensing system being configured to condense the vapor, a liquid can be harvested, for example liquid water that can be used as drinking water. This enables the production of safe drinking water from outside or ambient air, for example.

The use of a recirculation pump, that is configured for producing a recirculation flow on the second side of the membrane, provides a so-called recirculation flow, also referred to as sweep flow or sweep stream, on the second side of the membrane. This reduces the partial pressure when recirculating (dry) air on the second side of the membrane such that the difference in partial pressure over the membrane is increased and the driving force for the permeation is increased also. Because one can work at higher pressure and have a relatively high driving force, this improves the efficiency of the membrane unit for transferring water vapor from the ambient air on the first side of the membrane to the second side of the membrane, for example. Power requirements for the vacuum pump are reduced. Preferably, the second side of the membrane is part of a (semi-)closed circuit, enabling recirculation of a recirculation flow.

The sweep stream is preferably achieved by recirculating (dried) air from the outlet of the condensing system with a condenser to the membrane unit with the membrane. This recirculation is achieved with a recirculation pump.

A further effect of a sweep stream is that the boundary layers adjacent or attached to the membrane are significantly reduced. This reduces the membrane resistance against transfer of vapor from the first side to the second side of the membrane. Therefore, the sweep stream improves the overall efficiency of the membrane unit in membrane assisted humidity harvesting from a feed flow.

By recirculation of the gas on the second side of the membrane the energy requirement for cooling the gas and its components on the second side of the membrane to condense water vapor is effectively reduced, for example as compared to the use of a sweep stream at ambient pressure. This prevents energy loss and improves the overall efficiency of the system according the present invention. In fact, in a presently preferred embodiment according to the invention, the system operates with a low pressure recirculation sweep stream.

Preferably, the system comprises a pressure pump configured for producing a subnormal pressure in the recirculation flow. Providing a subnormal pressure lowers the total permeate side pressure, thereby increasing the driving force for the permeation of vapor through the membrane. This improves the efficiency of the liquid harvesting in the system.

In a presently preferred embodiment according to the present invention, the use of the pressure pump to produce a subnormal, i.e. below normal, pressure is combined with the use of a sweep stream/recirculation flow to further improve the permeation of vapor through the membrane. In this respect it is noted that a pressure below 20 mbar is often difficult to obtain in industrial applications. However, the combination of providing a subnormal pressure and providing a sweep stream further improves the transfer of vapor through the membrane, possibly even beyond the amount of transfer with vacuum only.

Preferably, the pressure in the recirculation flow on the second side of the membrane is in the range of 0-200 mbar, preferably 5-100 mbar, more preferably 10-65 mbar, and most preferably 20-40 mbar.

In a presently preferred embodiment according to the present invention, the condensing system is configured to operate at a temperature below 0° C.

Providing a (cooling) temperature below 0° C. further increases the driving force for the vapor to permeate the membrane from the first side to the second side thereof. The use of such low (cooling) temperature in the condensing system is enhanced by the use of the low pressure recirculation that is mentioned earlier. This further improves the capability and capacity to harvest humidity from a feed flow, including feed flows in areas that are dry and have a low vapor pressure. This increases the applicability of the system according to the invention and enables harvesting of humidity under a wide range of conditions that otherwise would not have access to safe drinking water, for example.

In a presently preferred embodiment according to the present invention, the condensing system comprises a first and a second heat exchanger.

By providing a first and a second heat exchanger the vapor is allowed to condensate on one or more of the heat exchangers. Preferably, at least two of the two or more heat exchangers are provided in a parallel configuration, such that the recirculation flow is provided to only some of the heat exchangers. This is especially relevant when operating at a temperature of below 0° C. when the water vapor freezes at or close to a surface of the heat exchanger. Surprisingly, although there is an additional energy requirement for the latent heat of freezing/deposition and the effect of an isolating ice layer on the heat exchanger, the use of the heat exchangers at a temperature below freezing point enables application of the system of the present invention under a wider range of conditions as compared to other approaches, including very dry areas with low vapor pressure. By providing a switching possibility, for example including a switching valve in the recirculation flow, one of the heat exchangers can be provided outside the flow and can be allowed to defreeze, such that the liquid water can be collected from the heat exchanger, for example.

The heat exchanger is preferably included in the condensing system of the system and can be embodied in different configurations including a cold plate, flow through exchanger etcetera.

In a presently preferred embodiment according to the present invention the membrane module comprises extruded fibers.

Water vapor has a relatively high transport speed/permeability with a membrane from extruded fibers, such as with fibers extruded from PolyDiMethylSiloxane (PDMS). In a further preferred embodiment the fibers comprise Pebax extruded fibers, or alternatively hollow fibers without a porous support. This may further improve the permeability of water vapor.

In a presently preferred embodiment according to the present invention the system further comprises an expansion valve located on the exit side of the condensing system, and wherein the recirculation pump comprises a vacuum pump located on a supply side the condensing system.

Providing a vacuum pump and expansion valve enables operating the condensing system more effectively. The driving force for extracting water can be further increased, thereby improving the overall process efficiency.

The present invention further relates to a wind turbine comprising a system as mentioned above.

The wind turbine provides the same effects and advantages as those described for the system. The use of a wind turbine provides a sustainable system. Furthermore, the wind turbine provides a stand-alone application such that also in remote areas safe drinking water can be produced with the system according to the present invention.

The invention further also relates to a method for humidity harvesting and/or harvesting a liquid from a feed flow, the method comprising the steps of:

providing the feed flow to a first side of a membrane in a membrane unit;

providing a recirculation flow on a second side of the membrane in the membrane unit with a recirculation pump;

transporting components from the feed flow to the recirculation flow; and condensing at least a part of the components in a condensing system on the second side of the membrane to provide a harvested liquid flow.

The method provides the same effects and advantages as those described for the system and/or the wind turbine. The method preferably involves providing the system in one of the described embodiments and enables humidity harvesting in an effective manner with low energy requirements and/or wide applicability including dry areas with low vapor pressure. This enables providing drinking water in such areas, for example. The use of a wind turbine further provides a sustainable and/or stand-alone application.

Preferably, the recirculation flow at the second side of the membrane is provided at a subnormal pressure. This results in a low pressure sweep stream at the second side of the membrane, thereby reducing the boundary layers that are located adjacent and/or are attached to the membrane, thereby improving the effectivity of the membrane. In addition, working at relatively low pressures reduces the (volume based) heat requirement for cooling the sweep flow.

Preferably, the pressure in the recirculation flow is in the range of 0-200 mbar, preferably 5-100mbar, more preferably 10-65 mbar and most preferably 20-40 mbar. Especially, the combination of recirculation and low pressure provides an effective harvesting at a subnormal pressure of 20 mbar or even higher. This improves the practical possibilities for application of the system and method according to the present invention.

In a presently preferred embodiment, the temperature of the condensing system is below 0° C. As mentioned earlier, this enables humidity harvesting at very dry areas with low vapor pressure, thereby providing safe drinking water at areas that otherwise would not have the benefit of safe drinking water.

Preferably, a first and a second heat exchanger are provided optionally operating at a temperature below the freezing point. This enables (semi-)continuous harvesting while one of the heat exchangers is outside the recirculation flow, such that the frozen water vapor can be collected as liquid water. Alternatively, only one heat exchanger is applied that is operated batch wise. When liquid has been collected, the recirculation flow can again be provided to the clean heat exchanger. This provides an effective operation with the system according to the present invention.

Further advantages, features and details of the invention are elucidated on the basis of preferred embodiments thereof, wherein reference is made to the companying drawings, in which.

Figure 1:
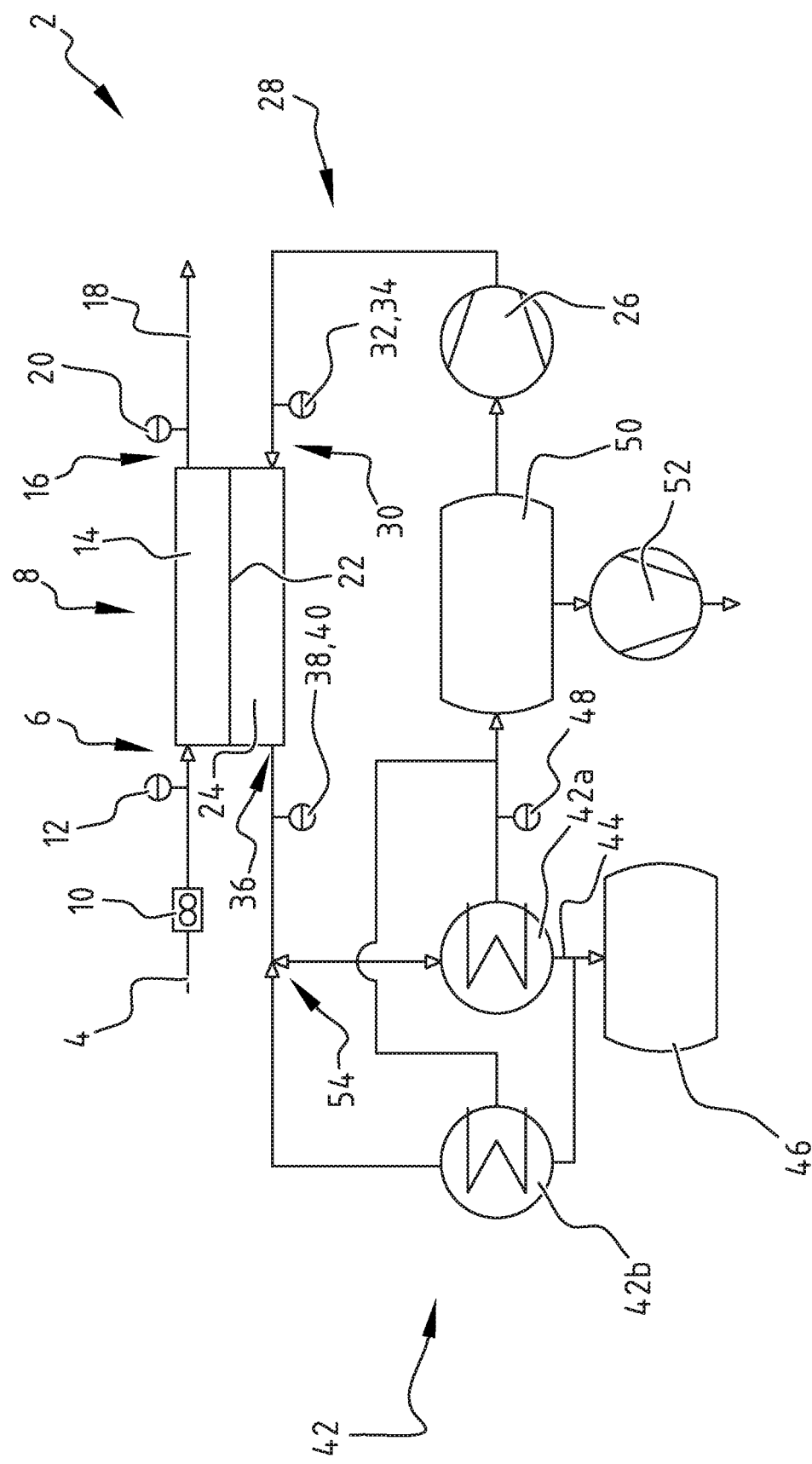
FIG. 1 shows a system according to the invention.

System 2 (FIG. 1) receives feed flow 4 at inlet 6 of membrane module 8. In the illustrated embodiment flow control 10 is provided in feed flow 4. Also humidity sensor 12 is provided before inlet 6 seen in the flow direction of feed flow 4. Feed flow 4 passes first side 14 of membrane module 8 towards exit 16. The output or retentate 18 is measured with humidity sensor 20. Membrane 22 separates first side 14 from second side 24 of membrane module 8.

For example, membrane module 8 can be embodied as a hollow fiber module with an internal fiber diameter of 0.8 mm and a surface area of 0.4 m², wherein the fibers have been coated with sulphonated-poly-ether-ether-ketone (SPEEK). Alternatively, a poly-dimethyl-siloxane (PDMS) module for membrane module 8 can be applied. It will be understood that other membranes can also be used. For example, membranes from other materials and/or extruded fibers, such as PDMS fibers and Pebax fibers, can be applied to achieve a membrane module.

On the second side 24 of membrane 22, recirculation pump 26 in recirculation circuit 28 provides recirculated (dry) gas at inlet 30 with humidity sensor 32 and pressure sensor 34. At the other end of membrane module 8 there is provided outlet 36 where humidity and pressure are measured with sensors 38, 40.

Water vapor passes through membrane 22 from first side 14 to second side 24 of membrane 22. Recirculated gas leaves membrane module 8 and is transported to condenser 42. Liquid water is collected at outlet 44 and is in the illustrated embodiment collected in water collection tank 46. The humidity of the gas flow after condenser 42 is measured with sensor 48. In the illustrated embodiment recirculation circuit 28 comprises buffer 50. Vacuum pump 52 is provided to achieve a subnormal pressure in recirculation circuit 28. From buffer 50 gas is recirculated with recirculation pump 26.

In the illustrated embodiment, condenser 42 comprises condensing unit 42a and condensing unit 42b with switching valves 54. It will be understood that different configurations with different switching means using different valves or another number of valves can also be envisaged.

Experiments with system 2 have been performed in which membranes 22 with SPEEK material are used. Results are shown in FIGS. 2-4.

Figure 2:
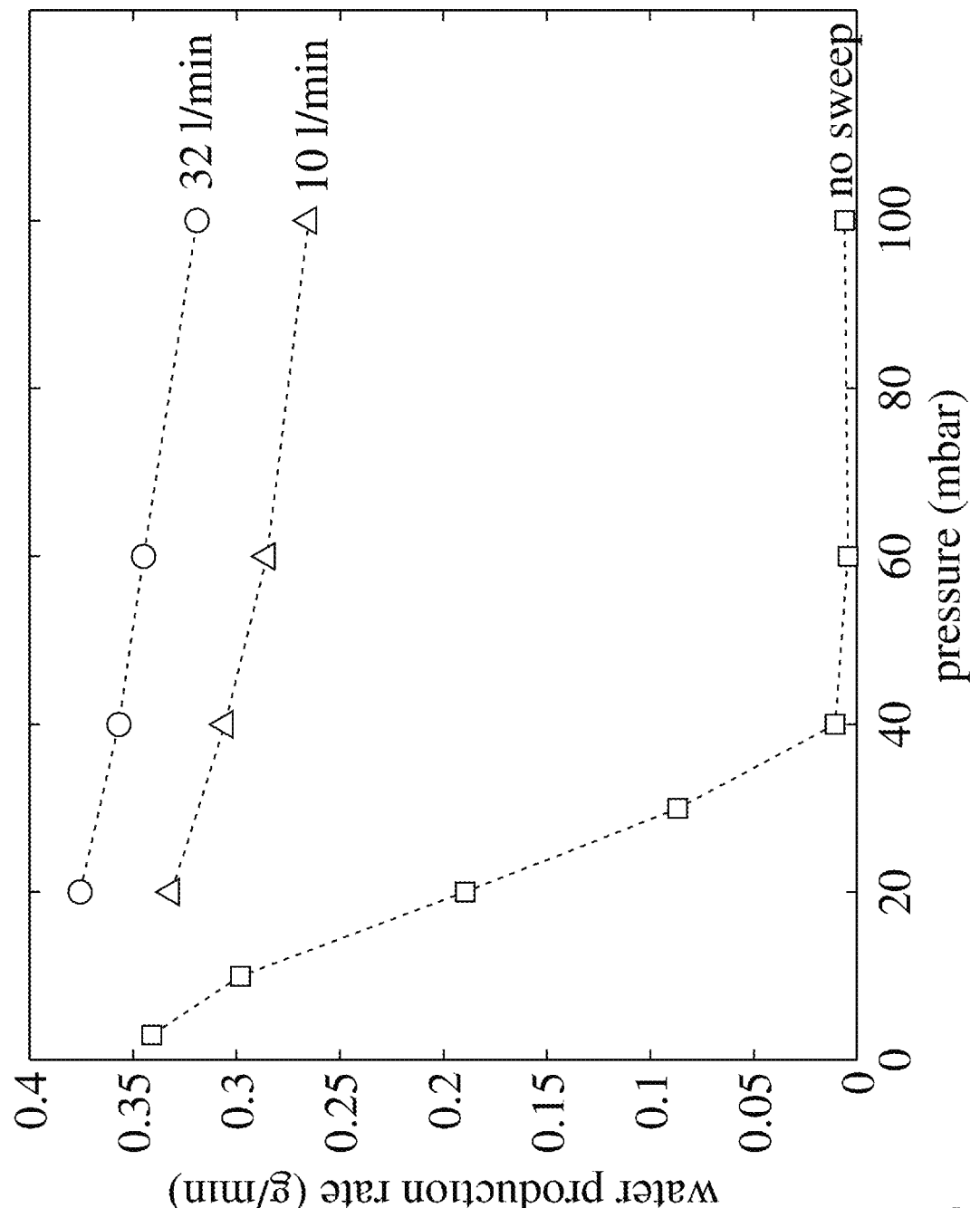
FIGS. 2-4 show experimental results with the system of FIG. 1.

The influence of the sweep stream rate on the water production rate at different pressures is shown in FIG. 2 with a flow rate of 10 l/min (Δ), 32 l/min (○) and compared to results with the system without any sweep stream (□). In experiments to determine the impact of the sweep flow rate, a feed flow rate of 15 l/min is used. From the results the enormous effect of the recirculation on water production rate is shown. Furthermore, without any recirculation, the pressure has to be minimal and close to zero, which is rather impractical. In presence of a sweep flow, the performance increases dramatically, enabling water production in the experimental setup of system 2 that are in the range of 0.3-0.4 g/min at higher pressures of 20-100 mbar and even higher. Pressures above 100 mbar, for example, further increase the energy demand for cooling a sweep stream at such relatively high pressures. The results show the significant effect of the combination of providing a sweep flow and a subnormal pressure.

As a further effect, the sweep stream further lowers the mean permeate side vapor pressure as residence time of permeated vapor molecules in the membrane module is reduced. Therefore, the somewhat higher productivity at the higher sweep flow rate can be explained by the reduction in residence time of permeated vapor molecules on the second side 24 of the membrane 22.

Figure 3:
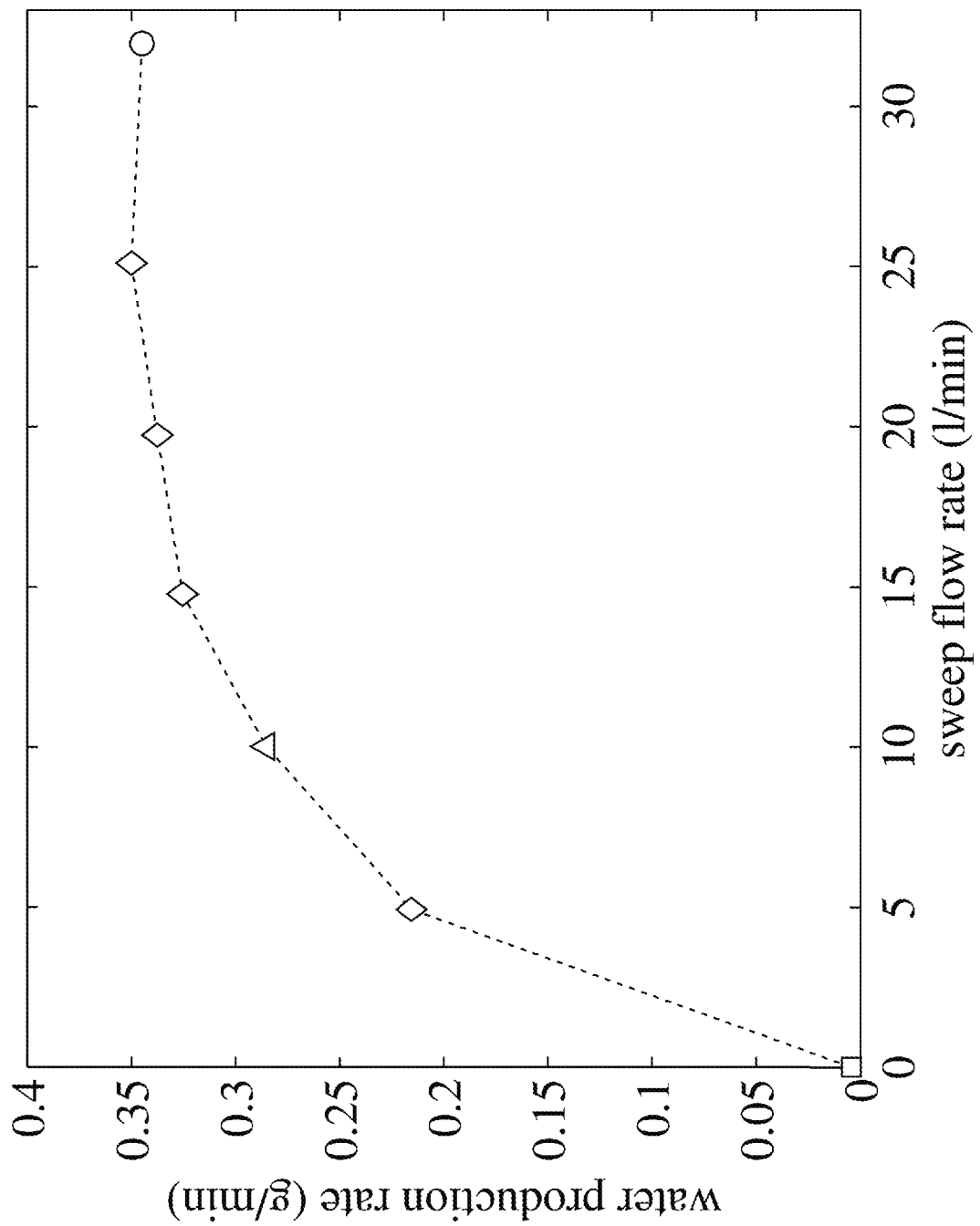
Figure 4:
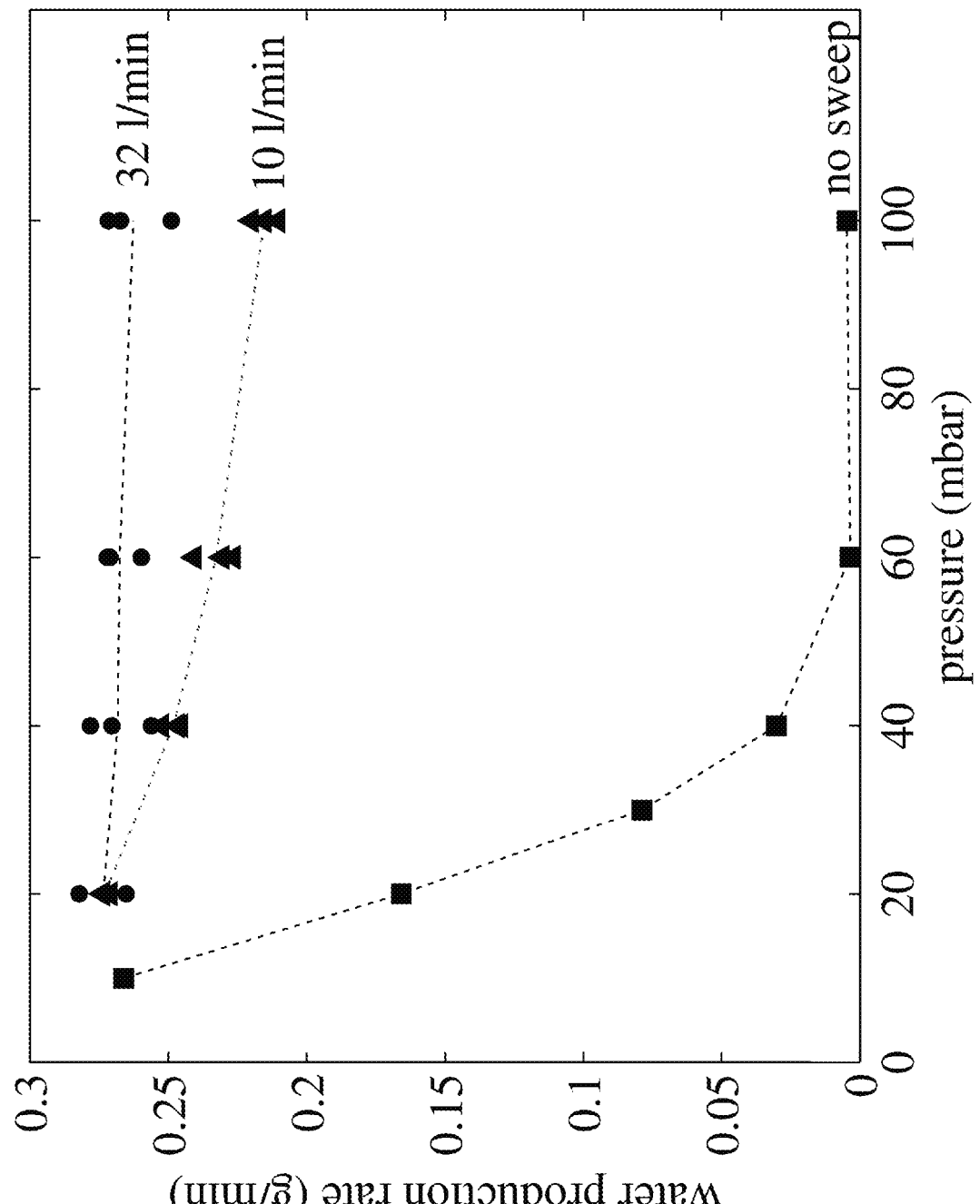

FIG. 3 illustrates the water production rate as function of the recirculation speed at 60 mbar permeate side pressure with values without any sweep flow (□), for 10 l/min (Δ) and 32 l/min (○) with a feed flow of 15 L/min, and condenser temperature of about 2° C. It is shown that without the recirculation no water is produced. From FIG. 3 it can be seen that the water production rate reaches a plateau. This could be explained with a reduction in residence time of the vapor molecule that ceases to have an effect as soon as the residence time of the vapor molecule gets short enough. At that point, the water production rate remains almost constant. In the experiment of which the results are shown in FIG. 3, this occurs at a sweep flow rate of about 20 l/min.

FIG. 4 shows the influence of a recirculated sweep stream on the water production at different system pressures with a recirculation flow rate of 10 l/min (▲) and 32 l/min (●) that are compared to the water production rate without any sweep stream (■). Also these results show that by using a sweep stream the water output for higher pressures can be enhanced significantly. The difference between the results shown in FIGS. 2 and 4 is that results in FIG. 4 have been collected using a sweep stream recirculated from the condenser. Apparently, at a rate of 32 l/min with a condenser temperature of about 2° C. an operational vapor pressure is achieved, in this experiment about 7 mbar vapor pressure at the membrane interface, that can already be achieved at a system pressure of 100 mbar, while at the lower sweep stream rate the mixing effect is not yet that developed, and the permeating vapor increases the permeate side vapor pressure, so that a pressure decrease still has some influence on the increase of the water production rate.

To produce safe drinking water system 2 is operated by providing ambient air to membrane module 8. At the same time, recirculation pump 26 is activated to produce a recirculation flow through membrane module 8. Condenser 42 is activated at a relatively low temperature to condense water vapor and produce safe drinking water.

Figure 5:
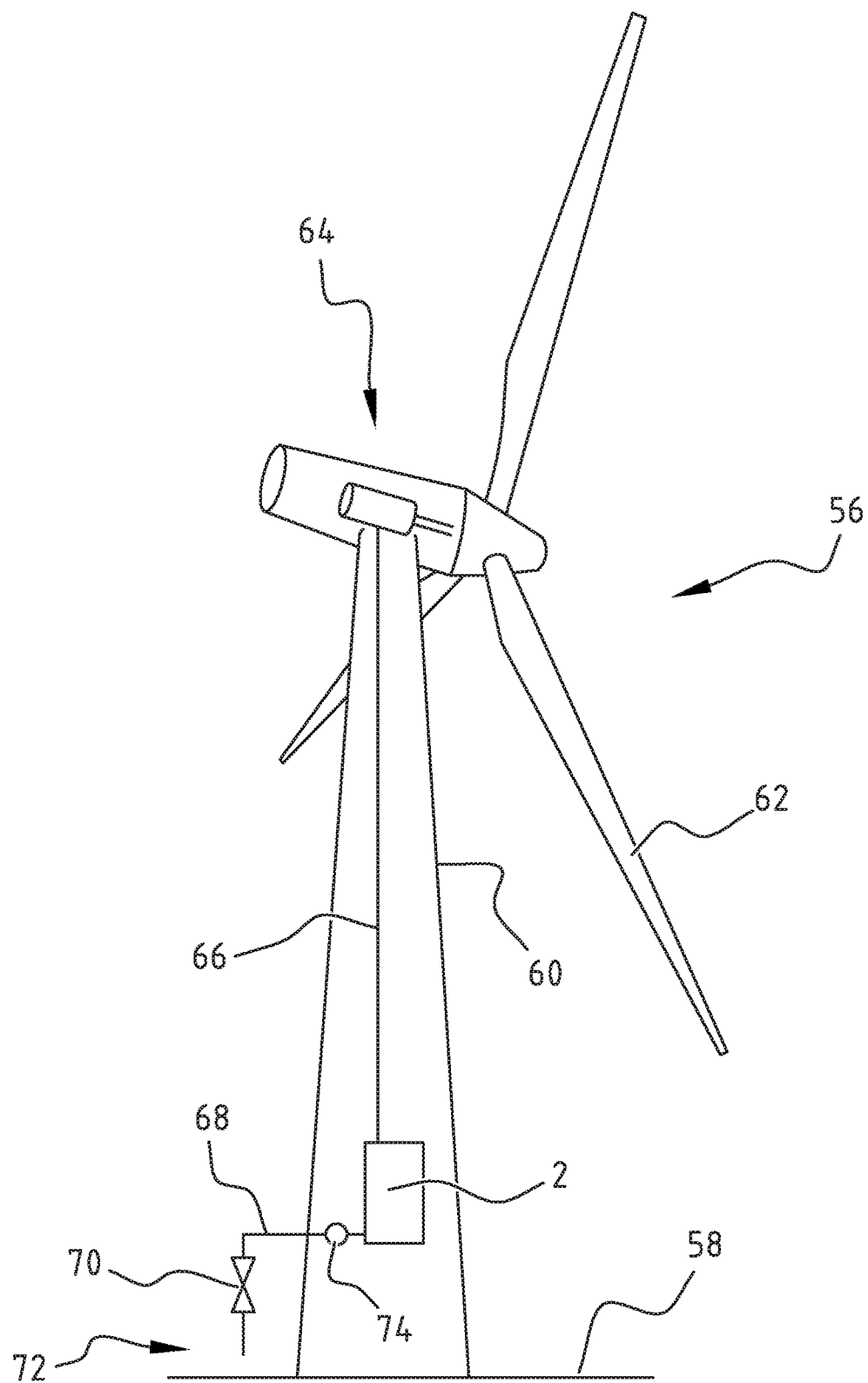
FIG. 5 shows a wind turbine with the system according to the invention.

Wind turbine 56 (FIG. 5) is placed on ground surface 58 and comprises mast 60 with a number of rotor blades 62 capable of rotating around shaft 64 to generate the required energy for operating system 2. Rotor axis 42 is connected with connection 66 to system 2. Output 68 of system 2 is provided with valve 70 and tap 72 enabling tapping safe drinking water with optional pump 74. Wind turbine 56 provides a sustainable and stand-alone embodiment of system 2.

Figure 6:
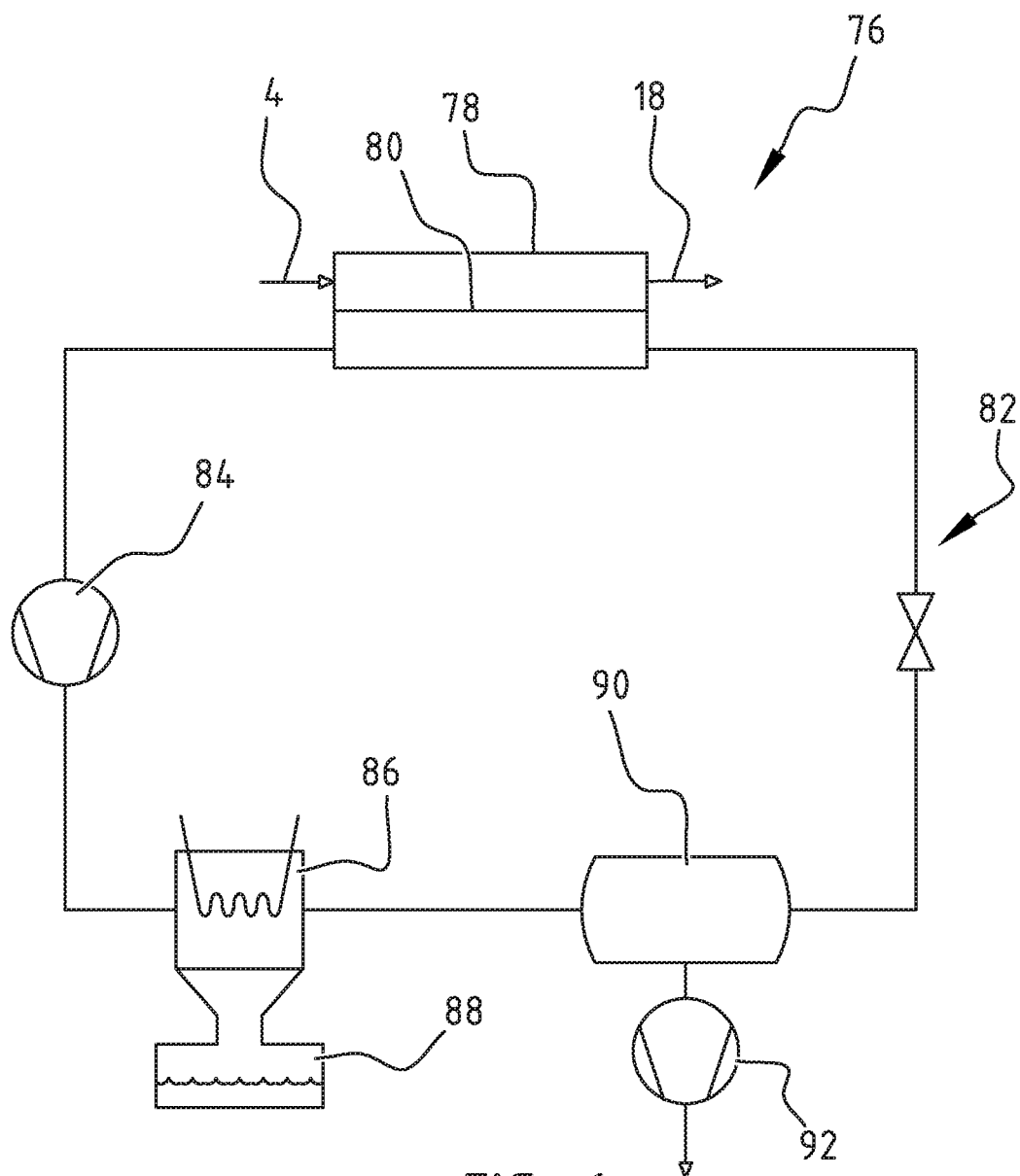
FIG. 6 shows an alternative system according to the invention.

Alternative system 76 (FIG. 6) comprises membrane module 78 with membrane 80. It is noted that some components, such as sensors, have been omitted from the illustrated embodiment for illustrative purposes. It will be understood that these components can be applied in system 76.

On the permeate side of membrane 80 in alternative system 76 there is a low pressure closed loop with recompression section 82. Recompression section 82 comprises compressor pump 84, condenser 86 with water collection tank 88, buffer 90 with vacuum pump 92 and expansion valve 94.

With alternative system 76, as an example, it is possible to have a pressure of 5 mbar, or 20 or 30 mbar, that can be compressed by compressor 84 to a pressure of 100 mbar, for example. Heat from the heated gas can be radiated to the environment and/or used in a heat exchanger (not shown) to save energy for cooling. Condenser 86, operating at a temperature of about 2° C. for example, collects the water in collector 88 and reduces vapor pressure to 7 mbar, for example. After buffer 90 and vacuum pump 92 expansion valve 94 reduces the pressure to 20 mbar, for example, and the vapor pressure to 1.4 mbar, for example. In the expansion the gas temperature may decrease. Optionally, the aforementioned heat exchanger (not shown) is used to heat up the gas. With alternative system 76 the driving force for the water collection is increased.

It will be understood that components of system 2 and alternative system 76 can be exchanged resulting in other alternative embodiments according to the invention.

The present invention is by no means limited to the above described preferred embodiments thereof. The rights sought are defined by the following claims, within the scope of which many modifications can be envisaged.

The invention claimed is:

1. System for membrane assisted humidity harvesting from a feed flow, comprising:
   a membrane unit with:
      a membrane,
      a feed flow inlet and a feed flow outlet on a first side of the membrane, and
      a recirculation inlet and a recirculation outlet on a second side of the membrane;
   wherein the membrane is configured to allow vapor to permeate through the membrane from the first side to the second side of the membrane;
   a condensing system provided on the second side of the membrane, configured for condensing vapor; and
   a recirculation pump configured for producing a recirculation flow on the second side of the membrane,
   wherein the condensing system comprises a first and a second heat exchanger and wherein the first and the second heat exchanger are provided in a parallel configuration that is configured such that at least one heat exchanger is outside the actual recirculation flow.

2. System according to claim 1, wherein the feed flow comprises outside air.

3. System according to claim 1, wherein the membrane unit comprises a water vapor selective membrane.

4. System according to claim 1, further comprising a pressure pump configured for producing a subnormal pressure in the recirculation flow.

5. System according to claim 4, wherein the pressure in the recirculation flow at the second side of the membrane is in the range of 0-200 mbar.

6. System according to claim 1, wherein the condensing system is configured to operate at a temperature below 0° C.

7. System according to claim 1, wherein the membrane module comprises extruded fibers.

8. System according to claim 7, wherein the fibers comprise a polyether block amide.

9. System according to claim 1, further comprising an expansion valve located on the exit side of the condensing system, and wherein the recirculation pump comprises a vacuum pump located on a supply side of the condensing system.

10. Wind turbine comprising a system according to claim 1.

11. Method for harvesting a liquid from a feed flow, comprising the steps of:
   providing the feed flow to a first side of a membrane in a membrane unit;
   providing a recirculation flow on a second side of the membrane in the membrane unit with a recirculation pump;
   transporting components from the feed flow to the recirculation flow; and
   condensing at least a part of the components in a condensing system on the second side of the membrane to provide a harvested liquid flow,
   wherein condensing at least a part of the components in a condensing system on the second side of the membrane to provide a harvested liquid flow comprises condensing at least a part of the components in a first and a second heat exchanger that are provided in a parallel configuration, wherein at least one heat exchanger is provided outside the recirculation flow.

12. Method according to claim 11, wherein the recirculation flow at the second side of the membrane is provided at a subnormal pressure.

13. Method according to claim 12, wherein the pressure in the recirculation flow at the second side of the membrane is in the range of 0-200 mbar.

14. Method according to claim 11, wherein the temperature of the condensing system is below 0° C.

15. Method according to claim 11, comprising the step of switching between the first and second heat exchanger.

16. System according to claim 1, further comprising an expansion valve located on the exit side of the condensing system, and wherein the recirculation pump comprises a vacuum pump located on a supply side of the condensing system.

* * * * *